(12) United States Patent
Nishii et al.

(10) Patent No.: US 7,501,196 B2
(45) Date of Patent: Mar. 10, 2009

(54) COOLANT AND COOLING SYSTEM

(75) Inventors: Mikito Nishii, Nishikamo-gun (JP);
Hiroyuki Arai, Toyota (JP); Tsutomu Sakai, Takatsuki (JP); Mitsuru Kondo, Nagaokakyo (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 231 days.

(21) Appl. No.: 10/585,760

(22) PCT Filed: Jan. 11, 2005

(86) PCT No.: PCT/JP2005/000443

§ 371 (c)(1),
(2), (4) Date: Jul. 12, 2006

(87) PCT Pub. No.: WO2005/068581

PCT Pub. Date: Jul. 28, 2005

(65) Prior Publication Data

US 2007/0104988 A1    May 10, 2007

(30) Foreign Application Priority Data

Jan. 13, 2004    (JP)    ............... 2004-005955

(51) Int. Cl.
*H01M 8/04*    (2006.01)
*H01M 8/00*    (2006.01)
*C09K 5/00*    (2006.01)
*C09K 5/08*    (2006.01)
*C09K 5/10*    (2006.01)

(52) U.S. Cl. ............... 429/26; 165/104.17; 165/104.21; 252/67; 252/70; 252/71; 252/73; 252/74; 252/75; 252/76; 252/77; 429/12; 429/20; 429/120

(58) Field of Classification Search ............... 252/70, 252/71, 73, 74, 75, 76, 77, 67; 165/104.17, 165/104.21; 429/12, 20, 26, 120
See application file for complete search history.

(56) References Cited

U.S. PATENT DOCUMENTS

| | | | |
|---|---|---|---|
| 4,585,709 A * | 4/1986 | Barlow ................... | 429/19 |
| 5,007,478 A * | 4/1991 | Sengupta ................. | 165/10 |
| 5,192,627 A * | 3/1993 | Perry et al. .............. | 429/17 |
| 5,324,495 A * | 6/1994 | Gorun ..................... | 423/439 |
| 5,344,721 A | 9/1994 | Sonai et al. | |
| 5,605,770 A * | 2/1997 | Andreoli et al. .......... | 429/20 |
| 5,723,059 A * | 3/1998 | Snyder, Jr. .............. | 252/70 |
| 6,290,870 B1 * | 9/2001 | Turcotte et al. .......... | 252/76 |
| 6,676,847 B2 * | 1/2004 | Turcotte et al. .......... | 252/76 |
| 6,740,438 B1 * | 5/2004 | Thom ..................... | 429/26 |
| 6,809,928 B2 * | 10/2004 | Gwin et al. .............. | 361/699 |
| 7,160,468 B2 * | 1/2007 | Matsuzaki ............... | 210/694 |

(Continued)

FOREIGN PATENT DOCUMENTS

JP    A 2-21572    1/1990

(Continued)

*Primary Examiner*—Anthony J Green
(74) *Attorney, Agent, or Firm*—Oliff & Berridge, PLC

(57) ABSTRACT

A coolant comprising a nonaqueous base. A phase change material may be dispersed or a highly heat conductive material may be dispersed or dissolved in the nonaqueous base. A nonaqueous coolant for a fuel cell excellent in heat transfer characteristics is provided as a coolant for fuel cell stacks.

8 Claims, 6 Drawing Sheets

U.S. PATENT DOCUMENTS

| | | | |
|---|---|---|---|
| 7,344,655 B1 * | 3/2008 | Nishii et al. | 252/75 |
| 7,462,413 B2 * | 12/2008 | Busenbender | 429/13 |
| 2004/0191586 A1 * | 9/2004 | Matsuzaki | 429/13 |
| 2004/0227124 A1 * | 11/2004 | Turcotte et al. | 252/71 |
| 2007/0298291 A1 * | 12/2007 | Nishii et al. | 429/15 |

FOREIGN PATENT DOCUMENTS

| | | |
|---|---|---|
| JP | 5-117174 A * | 5/1993 |
| JP | A 2001-164244 | 6/2001 |
| JP | A 2002-190313 | 7/2002 |
| JP | B2 3352716 | 9/2002 |
| WO | WO 02/12413 A2 | 2/2002 |
| WO | WO 03/004944 A2 | 1/2003 |
| WO | WO03106600 A1 * | 12/2003 |

* cited by examiner

COOLANT AND COOLING SYSTEM

TECHNICAL FIELD

The present invention relates to a coolant and a cooling system using the coolant. More specifically, the present invention relates to a coolant for a fuel cell, in particular, a coolant for a fuel cell for vehicles, and a cooling system for a fuel cell.

BACKGROUND ART

Generally, a stack of a fuel cell has a stacked structure of a plurality of cells, in which a cooling plate for cooling the stack (cells) is inserted between each sub-stack composed of a few layers of cells. The cooling plate has a coolant channel inside, through which a coolant flows so as to cool the stack. As herein described, since a coolant for a fuel cell circulates through a stack where electric power is generated, namely, between sub-stacks, high insulation performance is required in order to prevent electric leak to the outside of the stack and lowering of electrical efficiency caused by the resistance in the coolant (reduction of energy loss). To ensure such insulation performance and respond to the demand of retaining cooling efficiency, pure water has been used as a coolant in conventional arts. In addition to such demands, anti-rust properties are required for a coolant for fuel cell stacks in order to maintain a long product life of cooling plates. This requirement has been generally addressed by using a stainless steel material with high anti-rust properties for a cooling plate or by adding iron ions to a coolant as disclosed in JP Patent Publication (Kokai) No. 2-21572 (1989).

However, although such conventional approaches are effective for so-called stationary, installed-type medium or large fuel cells, or constantly operating fuel cells, they are not necessarily effective for non-stationary, small fuel cells such as fuel cells installed in vehicles or intermittently operating fuel cells.

For example, since the temperature of a coolant in intermittently operating non-stationary fuel cells falls to ambient temperature when the cell is not in operation, anti-freezing properties are required for the coolant under conditions where the ambient temperature is the freezing point or lower. This is because, if the coolant freezes, the cooling circuit including a cooling plate may be damaged. Furthermore, when the cooling circuit is damaged, possibly fuel cells do not operate sufficiently.

In this situation, taking anti-freezing properties into account, use of a coolant for cooling an internal combustion engine as a non-freezing coolant is an option. Such a coolant for cooling an internal combustion engine, however, is basically used in the area where no electricity is generated, and therefore low conductivity is not expected, and thus the coolant has extremely high electric conductivity. On the other hand, since electricity flows through a cooling pipe of a fuel cell stack, when the coolant has a high electric conductivity, the electricity generated in the fuel cell flows into the coolant and is lost. For this reason, such a coolant is unsuitable for a coolant for cooling a fuel cell stack.

Moreover, for non-stationary fuel cells installed in vehicles, making a fuel cell system including a cooling circuit lightweight is an important issue to be solved. Therefore, for achieving lightweight, light metals having high thermal conductivity such as aluminum materials are expected to be used for cooling plates or heat exchangers. Such light metals generally do not have anti-rust properties as high as that of stainless steel materials, and therefore, the coolant itself must have anti-rust properties.

Given this, the present inventors have filed an application related to a coolant comprising a base containing water and an anti-rust additive which keeps the conductivity of a coolant low and maintains the hydrogen ion exponent of the coolant at about neutral, which has been published as JP Patent Publication (Kokai) 2001-164244. Examples of such anti-rust additives include weak alkaline additives, weak acidic additives and nonionic substances. Saccharides such as quercetin and nonionic surfactants such as alkylglucoside are disclosed as nonionic substances.

DISCLOSURE OF THE INVENTION

The coolant disclosed in JP Patent Publication (Kokai) 2001-164244 is a coolant for fuel cell stacks and has low conductivity, anti-rust properties, high heat transfer properties and anti-freezing properties. However, in the fuel cell powered vehicles now in use, aqueous coolants are replaced with another one when the conductivity is increased, or ion exchange resin or the like is installed in vehicles to remove ionic products to deal with insulation properties in view of heat transfer characteristics. Further, to prevent increase in the conductivity caused by substances eluted from components at initial stages, the inside of cooling components is washed with pure water before assembling the components.

As described above, the coolants currently used are aqueous, and so the high voltage safety standard for electric vehicles (500 Ω/V) cannot be met. Thus, insulation resistance must be constantly monitored, and in emergency cases, another safety device such as a system of blocking the high voltage part must be combined. Moreover, washing of the inside of cooling components before assembling to prevent increase in the conductivity caused by substances eluted from the components at initial stages involves high costs. Further, since most additives in the coolant are ionic, additives are also removed by ion exchange resin installed in an in-vehicle cooling system, causing a problem of anti-corrosion properties. Also, neutral saccharides and nonionic surfactants have disadvantages. Saccharides are dispersed in liquid, and therefore unstable at low temperatures, and precipitates are formed, possibly causing clogging in the cooling system or water leak due to corrosion of seal. Nonionic surfactants have a small surface tension and high foamability, and therefore cavitation is formed.

The present invention has been made in order to solve the above problems and aims at providing a nonaqueous coolant for a fuel cell excellent in heat transfer characteristics as a coolant for fuel cell stacks.

To solve the above problem, firstly the coolant of the present invention comprises a nonaqueous base. More specifically, the nonaqueous base is at least one member selected from organic liquids, silicone liquids and chlorofluorocarbon liquids having a viscosity of 5 mPa·s or less.

Further, in the coolant of the present invention, a phase change material is dispersed in the nonaqueous base. Herein, the phase change material (PCM) improves apparent specific heat utilizing the latent heat generated when the substance changes from solid to liquid or liquid to solid. When such a phase change material is microencapsulated and dispersed in a nonaqueous base, dispersion stability improves.

In the coolant of the present invention, a highly heat conductive material is dispersed or dissolved in the nonaqueous base.

The coolant of the present invention is suitably used for fuel cells. The coolant is particularly suitably used for fuel cells for hybrid vehicles (FCHV).

Secondly, the present invention relates to a cooling system for a fuel cell, comprising a cooling circuit in which the above coolant and inert gas are included. The cooling system provides low conductivity, anti-rust properties, high heat transfer properties and anti-freezing properties. In addition, the system is capable of preventing degradation of quality of the coolant in the cooling circuit over a long period.

In the present invention, since the coolant is nonaqueous, a system for constantly monitoring insulation resistance is not needed. Further, there is no need to wash the inside of the components of the cooling system before assembling to prevent increase in the conductivity.

In the figures, each symbol denotes the following. 10 . . . fuel cell, 12 . . . stack, 20 . . . cell, 21 . . . air electrode, 22 . . . fuel electrode, 23 . . . matrix, 24 . . . separator, 30 . . . cooling separator, 32 . . . external cooling circuit, 34 . . . cooling circuit, 40 . . . end separator, 50 . . . central separator, 62, 63 . . . rib, 81, 82 . . . coolant hole, 83, 84 . . . fuel gas hole, 85, 86 . . . oxidation gas hole, 87 . . . groove.

BEST MODE FOR CARRYING OUT THE INVENTION

The nonaqueous base used for the coolant of the present invention is not particularly limited, and nonaqueous bases having a viscosity of 5 mPa·s or less are preferred. Specific examples thereof include alkylbenzene, dimethyl silicone and perfluorocarbon.

Figure 1:
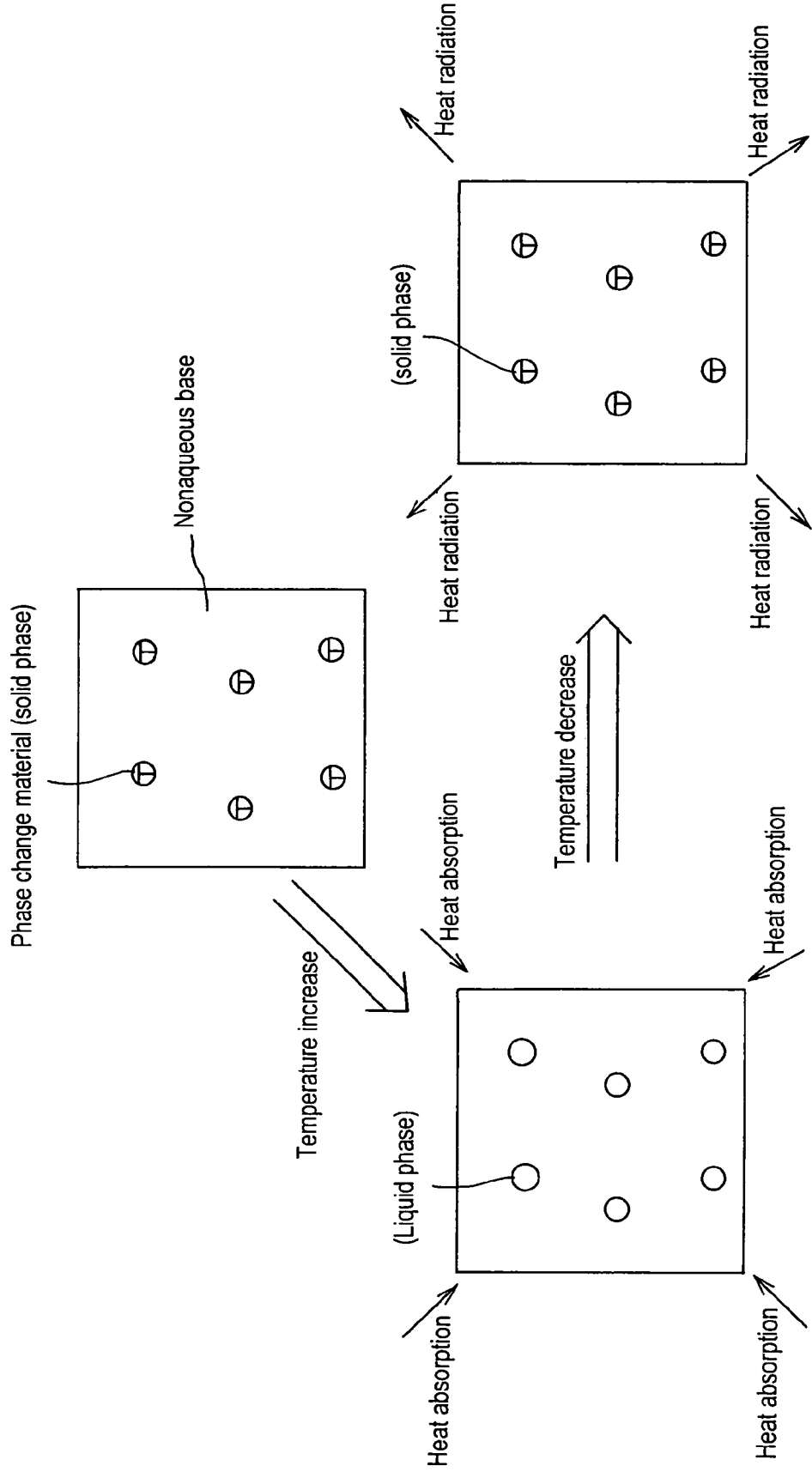
FIG. 1 is a schematic view illustrating the action of a phase change material (PCM)

FIG. 1 is a schematic view illustrating the action of a phase change material (PCM). The phase change material in the nonaqueous base is solid at room temperature and changes to liquid from solid when temperature increases. At this stage, the phase change material absorbs heat from the surroundings, and thus the amount of heat required for temperature increase is increased. On the other hand, when the temperature decreases, the phase change material changes to solid from liquid. At this stage, the phase change material releases heat to the surroundings, and thus the amount of heat required for temperature decrease is increased. As herein described, the apparent specific heat of a coolant is improved by using the latent heat involved in the phase change of a phase change material.

In the present invention, a phase change material having a melting point of 150° C. or lower is made into fine particles of 5 μm or less and homogenously dispersed in the nonaqueous base.

Specific examples of phase change materials include the followings.

(1) inorganic salt:
$LiClO_4.3H_2O$, $Mg(ClO_4)_2.6H_2O$, $Mn(ClO_4)_2.6H_2O$, $NaClO_4.H_2O$, $Ni(ClO_4)_2.6H_2O$, $Zn(ClO_4)_2.6H_2O$, $MoF_5$, $NbF_5$, $OsF_5$, $ZnF_2.4H_2O$, $MgCl_2.6H_2O$, $MnCl_2.4H_2O$, $NdCl_3.6H_2O$, $NiCl_2.6H_2O$, $OsCl_5$, $SrCl_2.6H_2O$, $SrBr.6H_2O$, $TiBr_3.6H_2O$, $LiI.3H_2O$, $SrI_2.6H_2O$, $TiI_4$, $Sr(OH)_2.8H_2O$, $LiSO_4.3H_2O$, $MgSO_4.7H_2O$, $NaSO_4.10H_2O$, $NiSO_4.6H_2O$, $Zn(SO_4).7H_2O$, $MgCO_3.3H_2O$, $Na_2CO_3.H_2O$, $Nd_2(CO_3)_3.8H_2O$, $LiCH_3COO.2H_2O$, $Mg(CH_3COO)_2.2H_2O$, $Mn(CH_3COO)_2.2H_2O$, $Mo(CH_3COO)_2.2H_2O$, $NH_4CH_3COO$, $NaCH_3COO.3H_2O$, $Sr(CH_3COO)_2.0.5H_2O$, $Al(ClO_4)_3.6H_2O$, $Cd(ClO_4)_2.6H_2O$, $Cu(ClO_4)_2.6H_2O$, $CoCl_2.6H_2O$, $CrCl_2.6H_2O$, $GaCl_3$, $AlBr_3.6H_2O$, $CoBr_2.6H_2O$, $CaI_2.6H_2O$, $Ba(OH)_2.8H_2O$.

(2) paraffin material:
octadecane, eicosane, tetracosane, triacontane.

(3) organic acid:
lauric acid, myristic acid, palmitic acid, stearic acid.

(4) polymer:
polyglycol, polyethylene.

(5) saccharides:
ribose, erythritol, mannitol, galactitol, pentaerythritol.

Figure 2:
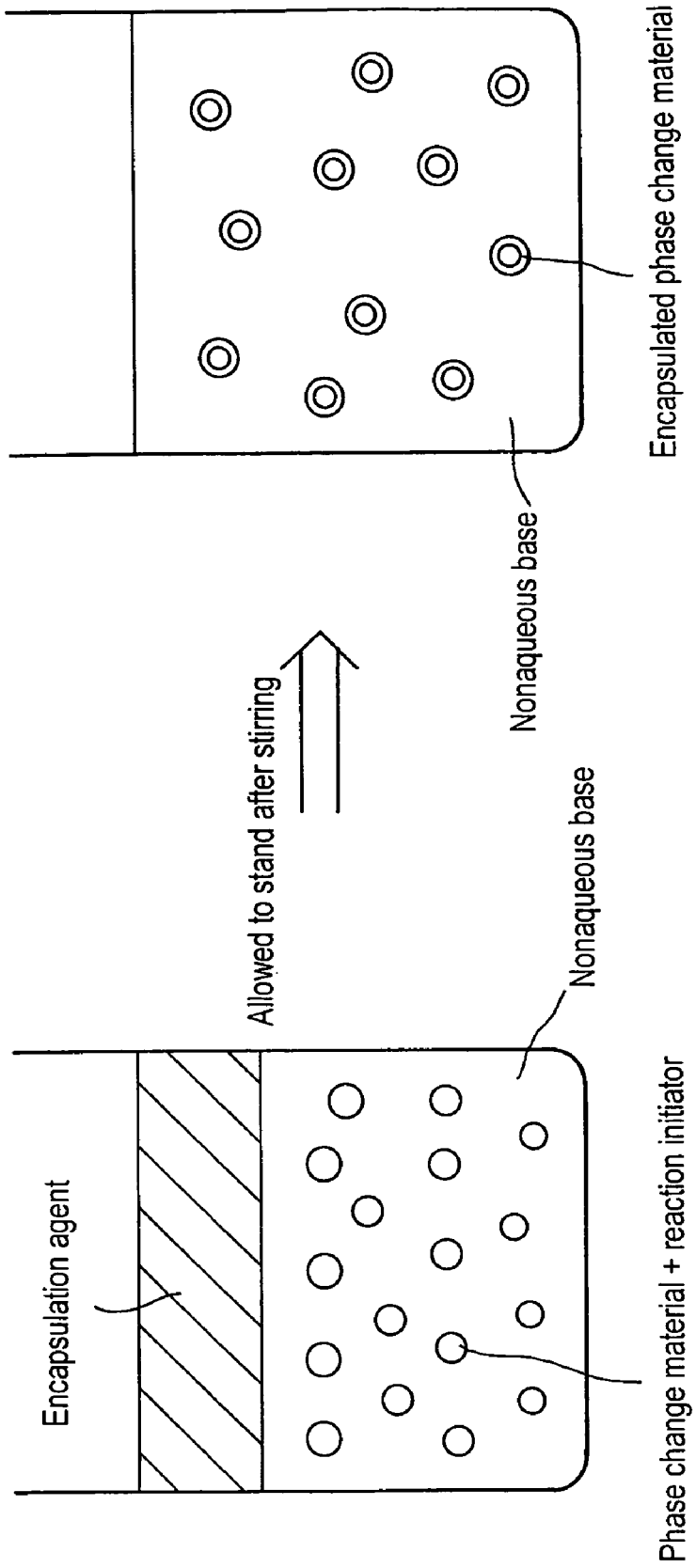
FIG. 2 is a schematic view illustrating a microencapsulation reaction of a phase change material.

FIG. 2 is a schematic view illustrating a microencapsulation reaction of a phase change material. After dispersing a phase change material containing a reaction initiator in a nonaqueous base, encapsulation components such as a silane coupling agent, a fluorine monomer, a reactive emulsifier adsorptive to inorganic particles are mixed, stirred and allowed to stand. These encapsulation components are adsorbed to the interface of the phase change material, react by the action of the reaction initiator in the phase change material, and cover the surface of the phase change material.

The highly heat conductive material is homogeneously dispersed or dissolved in the nonaqueous base. This produces an effect to improve the apparent specific heat as in the case of the above phase change material.

Specific examples of encapsulation components for microencapsulation of a phase change material include the followings.

(1) Silane Coupling Agent:

As silane coupling agents have affinity to inorganic materials, they are adsorbed to the interface of inorganic particles, react with water present therein, and form a polymer. The problem is that alcohol such as ethanol is produced upon formation of a polymer, and remains in a fluorine solvent or is incorporated into an inorganic substance. Therefore, ethanol is removed by distillation.

(2) Fluorine Monomer:

A fluorine monomer which contains a double bond and dissolves in perfluorocarbon, which is a refrigerant, is used. The monomer is polymerized in perfluorocarbon. For polymerizing at the interface, a polymerization initiator is added to PCM particles to emulsify, and then the fluorine monomer is dissolved therein to polymerize at the interface of particles.

(3) Reactive Emulsifier Adsorptive to Inorganic Particles:

Upon emulsifying inorganic particles, an emulsifier adsorptive to inorganic particles is added to induce polymerization reaction upon the emulsification.

Specific examples of highly heat conductive materials include magnesia, silicon carbide and fullerene. Of these, fullerene (C60, etc) dissolves in a specific organic solvent such as toluene. Utilizing its solution, fullerene is purified to 99% or higher purity by chromatography or other means. Such fullerene is available from, for example, Matsubo Corporation.

In the following, the coolant according to the present invention is described with reference to Examples and Comparative Examples.

Alkylbenzene (Example 1), dimethyl silicone (Example 2) and perfluorocarbon (Example 3) were used as nonaqueous bases. Barium hydroxide octahydrate, which is a phase change material, was each dispersed in a nonaqueous base, namely, alkylbenzene (Example 4), dimethyl silicone (Example 5) and perfluorocarbon (Example 6). The above-described highly heat conductive material, i.e., fullerene, was dispersed or dissolved in alkylbenzene (Example 7). For comparison, an ethylene glycol aqueous solution was used

COMPARATIVE EXAMPLE

Figure 3:
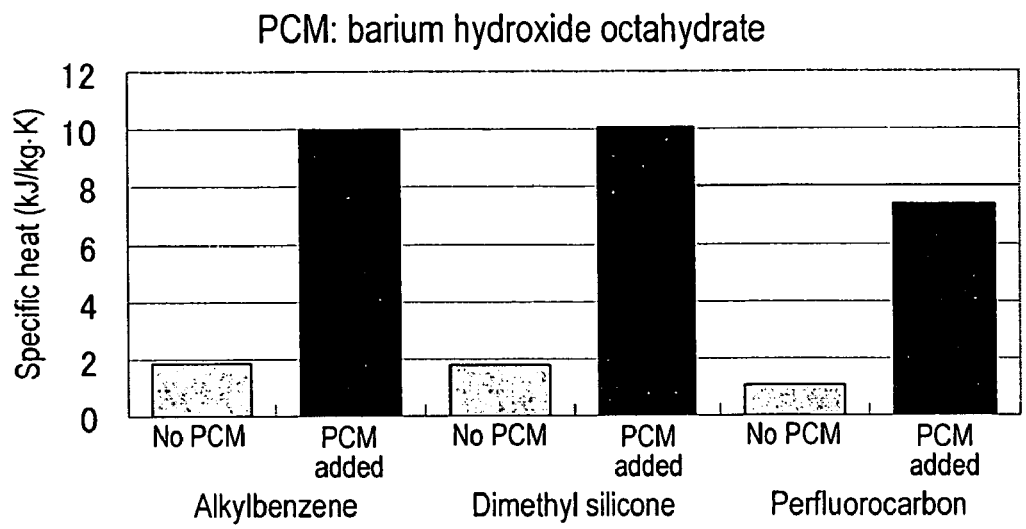
FIG. 3 shows a comparison of specific heat of nonaqueous bases in the presence and absence of a phase change material.
Figure 4:
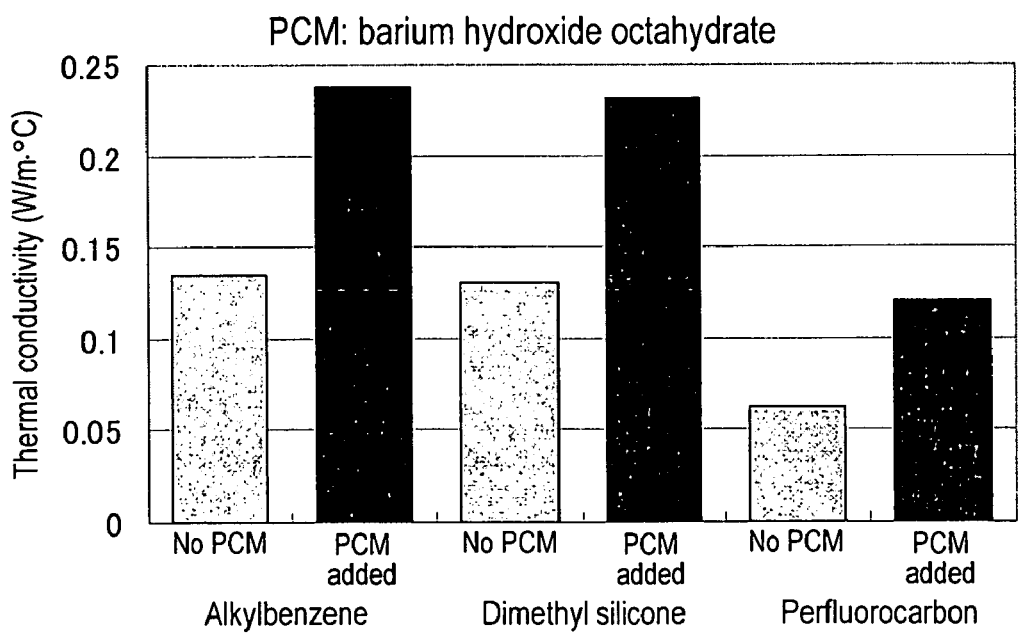
FIG. 4 shows a comparison of thermal conductivity of nonaqueous bases in the presence and absence of a phase change material.
Figure 5:
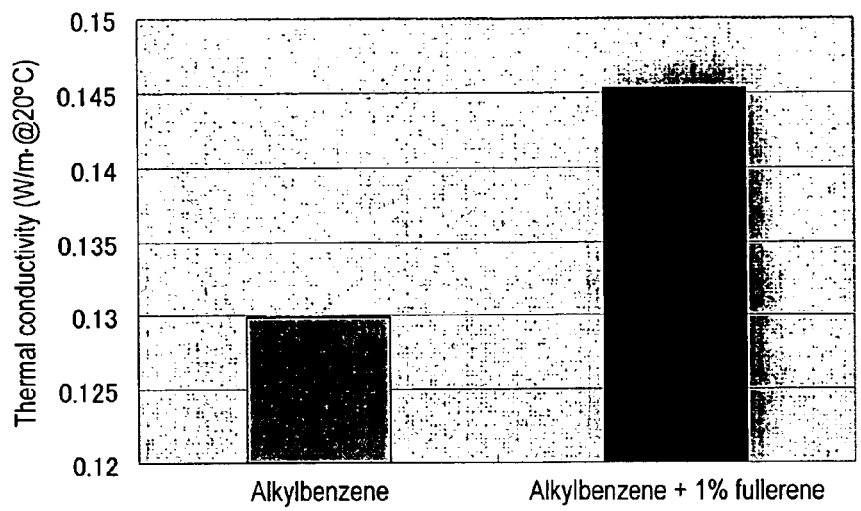
FIG. 5 shows a comparison of thermal conductivity of alkylbenzene in the presence and absence of fullerene.

Table 1 shows properties including conductivity and specific heat in Examples 1 to 7 and Comparative Example. Herein, when measuring conductivity, two electrodes are put into the coolant to be tested and how smoothly current flows through the electrodes is measured. This method is well-known to those skilled in the art. FIGS. 3 to 5 show the results obtained from Table 1, in which each nonaqueous base is compared based on the presence and absence of a phase change material.

and Example 5, and comparison between Example 3 and Example 6, thermal conductivity and specific heat are considerably increased when a phase change material or a highly heat conductive material is dispersed or dissolved in a nonaqueous base.

The above results show that the coolants in Examples 1 to 7 have low conductivity, high heat transfer properties and anti-freezing properties, and thus are suitable as a coolant for fuel cell stacks.

Figure 6:
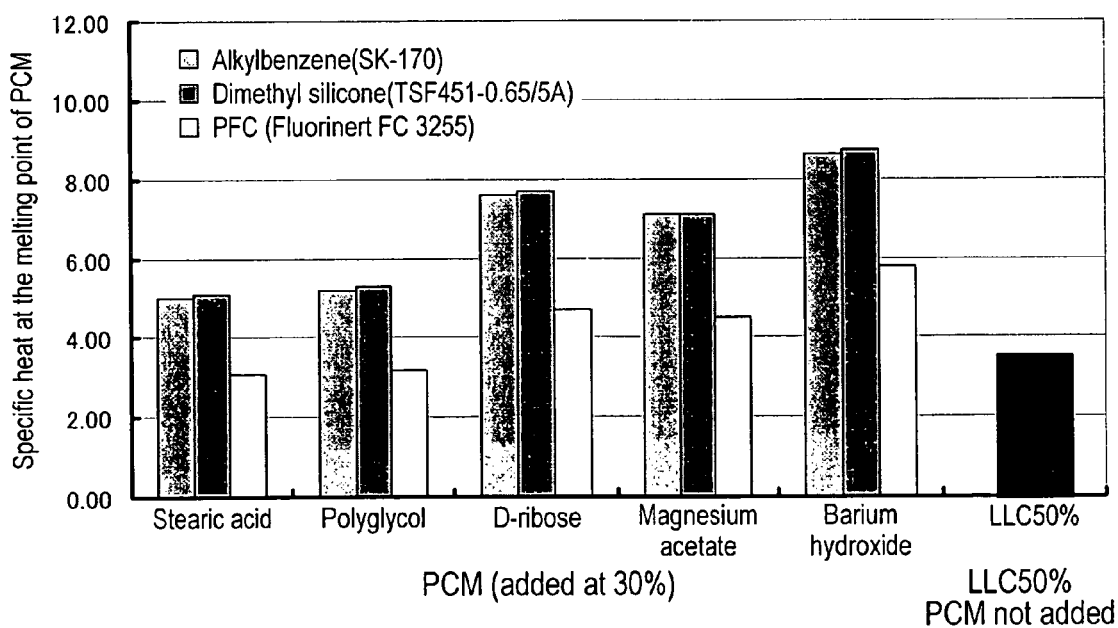
FIG. 6 shows a comparison of specific heat of various phase change materials at the melting point.

In the following, the apparent specific heat and the thermal conductivity of phase change materials are shown. Table 2 shows the apparent specific heat (kJ/kg·K) when phase change materials are dispersed at 30% by volume. Likewise, Table 3 shows the thermal conductivity (W/m·K) when the phase change materials are dispersed at 30% by volume. In addition, FIG. 6 shows the specific heat at the melting point of the phase change materials.

TABLE 1

|  | Example 1 | Example 2 | Example 3 | Example 4 | Example 5 | Example 6 | Example 7 | Comparative Example |
|---|---|---|---|---|---|---|---|---|
| Nonaqueous agent | alkyl benzene | dimethyl silicone | perfluoro-carbon | alkyl benzene | dimethyl silicone | perfluoro-carbon | alkyl benzene | aqueous ethylene glycol solution |
| Substance dispersed/dissolved |  | none |  |  | $Ba(OH)_2 \cdot 8H_2O$ |  | fullerene | — |
| Concentration of the substance (wt %) | — | — | — | 30 | 30 | 30 | 1 | 50 |
| Conductivity (μS/cm) | $<10^{-6}$ | $<10^{-6}$ | $<10^{-8}$ | $<10^{-6}$ | $<10^{-6}$ | $<10^{-8}$ | $<10^{-6}$ | 1 |
| Thermal conductivity (W/m · K) | 0.135 | 0.13 | 0.063 | 0.238 | 0.231 | 0.121 | 0.145 | 0.42 |
| Specific heat (kJ/kg · K) | 1.82 | 1.8 | 1.05 | 10 | 10.1 | 7.4 | — | 3.6 |
| Freezing temperature (° C.) | −80 | — | — | −80 | <−60 | −43 | −80 | −35 |

The results in Table 1 and FIGS. 3 to 5 show that conductivity is significantly decreased by the use of a nonaqueous base. Further, as is evident from comparison between Example 1 and Example 4, comparison between Example 2

TABLE 2

|  | — | Stearic acid | Polyglycol | D-ribose | Acetic acid Mg | Barium hydroxide |
|---|---|---|---|---|---|---|
| Alkylbenzene | 1.82 | 5.00 | 5.20 | 7.60 | 7.10 | 8.60 |
| Dimethyl silicone | 1.80 | 5.10 | 5.30 | 7.70 | 7.10 | 8.70 |
| PFC | 1.05 | 3.10 | 3.20 | 4.70 | 4.50 | 5.80 |
| Water | 4.19 | 6.40 | 6.50 | 8.60 | 6.10 | 9.30 |
| Water/ethylene glycol | 3.60 | 5.90 | 5.00 | 8.10 | 7.60 | 8.90 |

TABLE 3

|  | — | Stearic acid | Polyglycol | D-ribose | Acetic acid Mg | Barium hydroxide |
|---|---|---|---|---|---|---|
| Alkylbenzene | 0.135 | 0.160 | 0.161 | 0.161 | 0.199 | 0.201 |
| Dimethyl silicone | 0.130 | 0.155 | 0.157 | 0.157 | 0.193 | 0.194 |
| PFC | 0.063 | 0.087 | 0.087 | 0.087 | 0.099 | 0.099 |
| Water | 0.610 | 0.463 | 0.468 | 0.468 | 0.602 | 0.697 |
| Water/ethylene glycol | 0.420 | 0.358 | 0.362 | 0.362 | 0.515 | 0.525 |

The results in Table 2 and Table 3 and FIG. 6 show that the specific heat and the thermal conductivity are also considerably increased by dispersing another phase change material in a nonaqueous base, and so such phase change materials are also effective for a coolant.

[Capsulation of Phase Change Material]

When a silane coupling agent is added to a chlorofluorocarbon refrigerant in which barium hydroxide octahydrate particles are dispersed, two phases are separated, or float, at an initial stage, but the coupling agent is adsorbed to the interface of the inorganic particles upon stirring. Thereafter, when the temperature was brought to about 55° C., heat generation was observed in the coupling reaction.

After performing a test to repeat heating of the coolant "fluorine oil: perfluorocarbon+PCM: 30 vol % $Ba(SO_4)_2 \cdot 8H_2O$" prepared above, the particle size of PCM was measured. As a result, without microcapsules, the PCM particle size was distributed in two large peaks. In contrast, the PCM with microencapsulation was monodisperse at a particle size of 0.304 μm.

This means that the problem with a coolant in which PCM is dispersed in a nonaqueous base that the particle size of PCM is increased and precipitate is formed due to coalescence of PCM under conditions of use where heating and cooling are repeated or during long storage can be prevented by microencapsulation of PCM.

Figure 7:
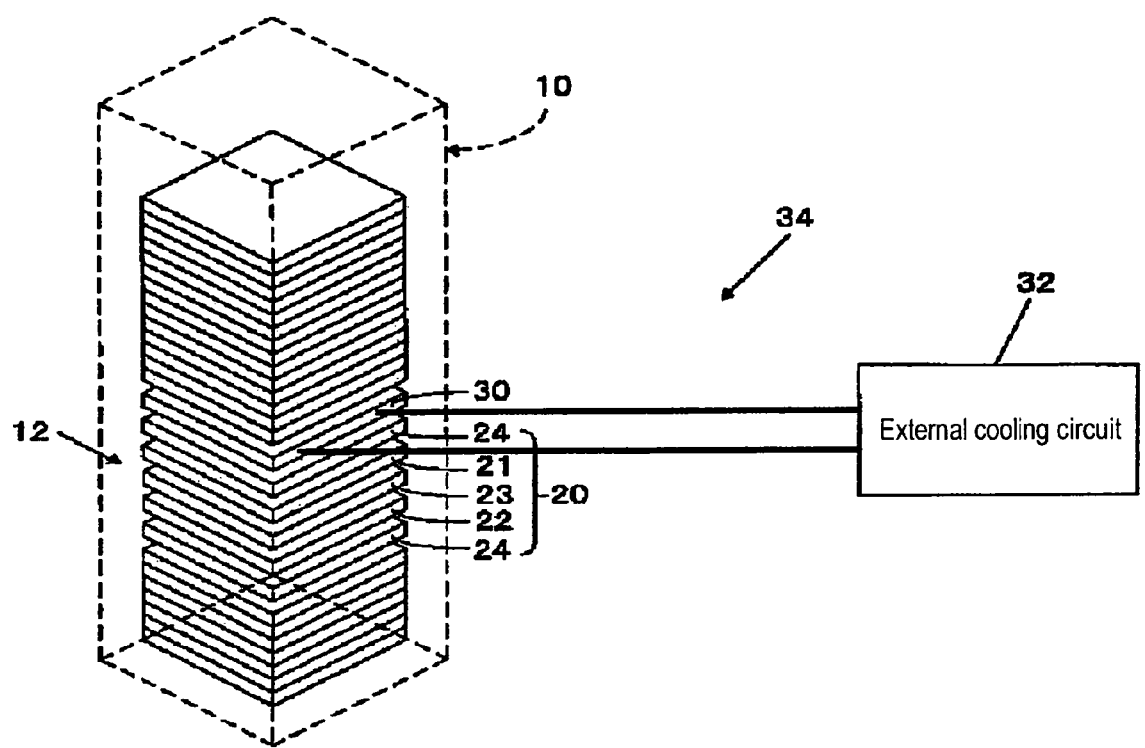
FIG. 7 is a block diagram of a fuel cell stack cooling system to which an Example of the present invention can be applied.
Figure 8:
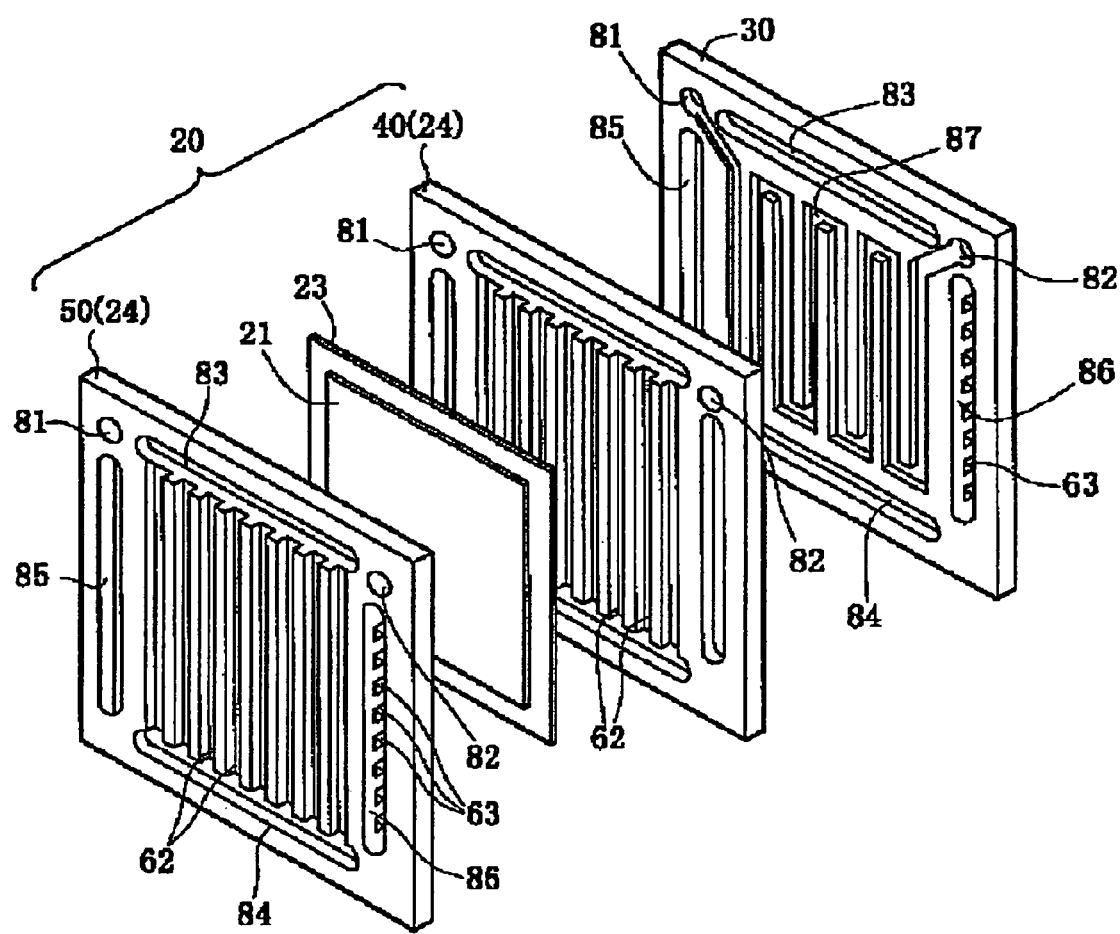
FIG. 8 is an exploded perspective view illustrating a stacked structure of a cell 20.

[Fuel Cell Stack Cooling System] A fuel cell stack cooling system composed of the above coolant as a refrigerant is now described with reference to FIG. 7 and FIG. 8. FIG. 7 is a block diagram illustrating a fuel cell stack cooling system to which an embodiment of the present invention can be applied. FIG. 8 is an exploded perspective view illustrating a stacked structure of a cell 20.

Referring to FIG. 7, a stack 12 of a fuel cell 10 is composed of a plurality of cells 20 arranged in layers. The cell 20 each has an air electrode 21, a fuel electrode 22, a matrix (electrolyte) 23 sandwiched between the air electrode 21 and the fuel electrode 22, and separators 24 made of compact carbon provided on the outer side of the fuel electrode 22 and the air electrode 21. A cooling separator 30 made of aluminum is provided on the separator 24 as each of the cells 20 is stacked.

In the present Example, the separator 24 is provided as an end separator 40 or a central separator 50. The cooling separator 30 and the separators 40, 50 have a shape of a plate whose surface to be stacked is square. Coolant holes 81,82 having a circular cross-section are formed at two positions (both upper corners in FIG. 8) on the peripheral part of the cooling separator 30, the end separator 40 and the central separator 50. The coolant holes 81,82 form a channel of a coolant piercing through the stack in the stacked direction when the stack is formed. A pair of long and thin fuel gas holes 83, 84 and a pair of oxidation gas holes 85,86 are formed near the edge of each side of the surface to be stacked of the above three separators along the side. The fuel gas holes 83,84 form a channel of fuel gas containing hydrogen and the oxidation gas holes 85,86 form a channel of oxidation gas containing oxygen, piercing through the stack in the stacked direction when the stack is formed.

The cooling separator 30 is connected to an external cooling circuit 32 through a coolant path to form a cooling circuit 34 including the cooling separator 30. A plurality of parallel groove-shaped ribs 63 connecting the opposing oxidation gas holes 85,86 are formed on one side of the cooling separator 30 (on the rear side in FIG. 8). The ribs 63 form an oxidation gas channel with the adjacent air electrode 21 when the stack is formed. Further, a winding groove 87 connecting the above-described coolant holes 81,82 is formed on the other side of the cooling separator 30 (on the front side in FIG. 8). When the stack is formed, the cooling separator 30 comes next to the end separator 40, and at that stage, the groove 87 forms a channel of a coolant with the flat surface of the end separator 40.

A plurality of parallel groove-shaped ribs 62 connecting the opposing fuel gas holes 83,84 are formed on one side of the end separator 40 (on the front side in FIG. 8). The ribs 62 form a fuel gas channel with the adjacent fuel electrode 22 when the stack is formed. The other side of the end separator 40 (on the rear side in FIG. 8) is flat without a groove structure.

A plurality of groove-shaped ribs 62 connecting the opposing fuel gas holes 83,84 are formed on one side of the central separator 50 (on the front side in FIG. 8). The ribs 62 form a fuel gas channel with the adjacent fuel electrode 22 when the stack is formed. A plurality of groove-shaped ribs 63 connecting the opposing oxidation gas holes 85,86 and perpendicular to the ribs 62 are formed on the other side of the central separator 50 (on the rear side in FIG. 8). The ribs 63 form an oxidation gas channel with the adjacent air electrode 21 when the stack is formed.

Although the above-described separator 24 (40, 50) is made of compact carbon, the separator may be made of another material having conductivity. For example, in view of rigidity and heat transfer properties, the separator may be made of metal such as copper alloy or aluminum alloy.

The above coolant (i.e., the coolant of Examples 1 to 7) is used as the coolant in the cooling circuit. When the coolant is included in the cooling circuit 34, inert gas, e.g., nitrogen gas is included therein together. Therefore, air in the cooling circuit 34 and dissolved oxygen in the coolant are replaced with nitrogen gas, and deterioration of coolant caused by dissolved oxygen can be prevented. This is supported by the test results in the above Examples.

The fuel cell coolant according to the present invention has been described above with reference to Examples, but the above Examples only help to understand the present invention and do not limit the present invention.

The block diagram of a fuel cell stack cooling system in FIG. 7 and FIG. 8 is an example, and the cooling system is not limited thereto as long as the system is composed of, as a refrigerant of the cooling circuit, the coolant of the present invention included therein with inert gas.

Further, in the above Examples, particularly an aluminum material was used for the cooling circuit including a cooling plate. However, use of another material for the cooling circuit is not excluded.

INDUSTRIAL APPLICABILITY

A coolant comprising a nonaqueous base or a coolant comprising a nonaqueous base, a phase change material and a highly heat conductive material of the present invention has low conductivity, high heat transfer properties and anti-freezing properties, and is particularly useful as a coolant for a fuel cell.

The invention claimed is:

1. A cooling system for a fuel cell, comprising a cooling circuit containing a coolant and an inert gas,
   wherein the coolant comprises a nonaqueous base and a phase change material comprised of an inorganic salt dispersed in the nonaqueous base.

2. The cooling system according to claim 1, wherein the phase change material is microencapsulated and dispersed in the nonaqueous base.

3. The cooling system according to claim 1, wherein the phase change material is barium hydroxide hydrate.

4. The cooling system according to claim 1, wherein the nonaqueous base is at least one member selected from the group consisting of organic liquids, silicone liquids and chlorofluorocarbon liquids having a viscosity of 5 mPa·s or less.

5. A cooling system for a fuel cell, comprising a cooling circuit containing a coolant and an inert gas,
wherein the coolant comprises a nonaqueous base and a heat conductive material dissolved in the nonaqueous base.

6. The cooling system according to claim 5, wherein the nonaqueous base is at least one member selected from the group consisting of organic liquids, silicone liquids and chlorofluorocarbon liquids having a viscosity of 5 mPa·s or less.

7. The cooling system according to claim 5, wherein the heat conductive material is fullerene and the nonaqueous base is an organic solvent that dissolves fullerene.

8. The cooling system according to claim 7, wherein the organic solvent is toluene.

* * * * *